(12) United States Patent
Snyder

(10) Patent No.: US 11,920,525 B2
(45) Date of Patent: Mar. 5, 2024

(54) LIQUID AND HYDROGEN/METHANE FUEL INJECTOR

(71) Applicant: RTX Corporation, Farmington, CT (US)

(72) Inventor: Timothy S. Snyder, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/881,853

(22) Filed: Aug. 5, 2022

(65) Prior Publication Data
US 2024/0044293 A1 Feb. 8, 2024

(51) Int. Cl.
*F02C 9/40* (2006.01)
*F02C 7/22* (2006.01)
*F23R 3/36* (2006.01)

(52) U.S. Cl.
CPC ........... *F02C 9/40* (2013.01); *F02C 7/22* (2013.01); *F23R 3/36* (2013.01)

(58) Field of Classification Search
CPC .............. F02C 9/40; F02C 7/22; F23R 3/36
See application file for complete search history.

(56) References Cited

U.S. PATENT DOCUMENTS

| | | | | |
|---|---|---|---|---|
| 5,251,447 A | * | 10/1993 | Joshi | ............ F23R 3/14 |
| | | | | 431/185 |
| 5,351,477 A | * | 10/1994 | Joshi | ............ F23D 17/002 |
| | | | | 60/737 |
| 8,621,870 B2 | | 1/2014 | Carroni et al. | |
| 10,228,137 B2 | | 3/2019 | Kopp-Vaughan et al. | |
| 2007/0044477 A1 | * | 3/2007 | Held | ............ F23R 3/36 |
| | | | | 60/776 |
| 2010/0050644 A1 | | 3/2010 | Pidcock et al. | |
| 2010/0212322 A1 | | 8/2010 | York et al. | |
| 2013/0040255 A1 | * | 2/2013 | Shi | ............ C10J 3/503 |
| | | | | 431/75 |
| 2016/0033132 A1 | | 2/2016 | Venkatesan et al. | |
| 2017/0299190 A1 | | 10/2017 | Patel et al. | |

FOREIGN PATENT DOCUMENTS

EP 3220050 A1 9/2017

OTHER PUBLICATIONS

European Search Report for European Application No. 23190087.9; dated Dec. 11, 2023; 8 pages.

* cited by examiner

*Primary Examiner* — J. Todd Newton
(74) *Attorney, Agent, or Firm* — CANTOR COLBURN LLP

(57) ABSTRACT

Fuel injectors for gas turbine engines include an inner housing having a center body installed within the inner housing, an intermediate housing arranged radially outward from the inner housing, and an outer housing arranged radially outward from the intermediate housing. The center body is a hollow body structure defining a center body airflow passage therethrough, a first fluid passage is partially defined between an outer surface of the inner housing and an inner surface of the intermediate housing, a second fluid passage is partially defined within the intermediate housing, and a third fluid passage comprises the center body airflow passage, an inner airflow passage defined between an exterior surface of the center body and an interior surface of the inner housing, and an outer airflow passage that is defined by the outer housing and radially outward from the intermediate housing.

17 Claims, 12 Drawing Sheets

LIQUID AND HYDROGEN/METHANE FUEL INJECTOR

BACKGROUND

The subject matter disclosed herein generally relates to components for combustors in turbine engines and, more particularly, to improved cooling and operation of injectors for combustors of turbine engines such as for use with hydrogen fuel.

Aircraft turbine engines, such as those that power modern commercial and military aircraft, include a compressor section to pressurize a supply of air, a combustor section to burn a fuel in the presence of the pressurized air, and a turbine section to extract energy from the resultant combustion gases to generate thrust. The combustor section generally includes a plurality of circumferentially distributed fuel injectors that project toward a combustion chamber to supply fuel to be mixed and burned with the pressurized air. Aircraft turbine engines typically include a plurality of centralized staging valves in combination with one or more fuel supply manifolds that deliver fuel to the fuel injectors.

Each fuel injector typically has an inlet fitting connected to the manifold at the base, a conduit connected to the base fitting, and a nozzle connected to the conduit to spray the fuel into the combustion chamber. Appropriate valves or flow dividers are provided to direct and control the flow of fuel through the nozzle.

Some current aircraft fuel injectors are configured for and optimized for dual fuel (e.g., No. 2 Fuel Oil and Methane) with water injection to reduce NOx. As the aircraft industry transitions away from using hydrocarbon-based fuels, there is a desire to mix hydrogen with Methane at very high levels, up to and including 100% hydrogen. Because of the high flame speeds and reaction rates of hydrogen, flashback can occur at high pressure and temperature allowing the flame to attach on the gas fuel swirl vanes causing damage. As such, improved systems may be necessary to implement hydrogen use in aircraft combustion systems.

SUMMARY

According to embodiments of the present disclosure, fuel injectors for gas turbine engines are provided. The fuel injectors include an inner housing having a center body installed within the inner housing, an intermediate housing arranged radially outward from the inner housing, and an outer housing arranged radially outward from the intermediate housing. The center body is a hollow body structure defining a center body airflow passage therethrough, a first fluid passage is partially defined between an outer surface of the inner housing and an inner surface of the intermediate housing, a second fluid passage is partially defined within the intermediate housing, and a third fluid passage comprises the center body airflow passage, an inner airflow passage defined between an exterior surface of the center body and an interior surface of the inner housing, and an outer airflow passage that is defined by the outer housing and radially outward from the intermediate housing.

In addition to one or more of the features described above, or as an alternative, further embodiments of the fuel injectors may include that the center body comprises inner path vanes arranged on the exterior surface thereof, the inner path vanes arranged within the inner airflow passage to impart a swirl to a fluid passing therethrough.

In addition to one or more of the features described above, or as an alternative, further embodiments of the fuel injectors may include that the center body includes an open first end and a partially open, downstream second end.

In addition to one or more of the features described above, or as an alternative, further embodiments of the fuel injectors may include that the downstream second end comprises an impingement plate and an effusion plate.

In addition to one or more of the features described above, or as an alternative, further embodiments of the fuel injectors may include that the intermediate housing includes a gas swirler vane assembly arranged within the second fluid passage to impart a swirl to a fluid passing through the second fluid passage.

In addition to one or more of the features described above, or as an alternative, further embodiments of the fuel injectors may include that the second fluid passage comprises an accelerating passage defined downstream of the gas swirler vane assembly.

In addition to one or more of the features described above, or as an alternative, further embodiments of the fuel injectors may include that the second fluid passage comprises an accelerating passage at an outlet of the second fluid passage.

In addition to one or more of the features described above, or as an alternative, further embodiments of the fuel injectors may include that the outer housing includes one or more outer path vanes arranged within the outer airflow passage to impart a swirl to a fluid passing through the outer airflow passage.

In addition to one or more of the features described above, or as an alternative, further embodiments of the fuel injectors may include that the first fluid passage is configured to receive a liquid fuel.

In addition to one or more of the features described above, or as an alternative, further embodiments of the fuel injectors may include that the liquid fuel comprises water.

In addition to one or more of the features described above, or as an alternative, further embodiments of the fuel injectors may include that the second fluid passage is configured to receive a gaseous fuel.

In addition to one or more of the features described above, or as an alternative, further embodiments of the fuel injectors may include that the gaseous fuel comprises hydrogen.

According to some embodiments, turbine engines are provided. The turbine engines include a compressor section and a combustor section. The combustor section includes a fuel injector having an inner housing having a center body installed within the inner housing, an intermediate housing arranged radially outward from the inner housing, and an outer housing arranged radially outward from the intermediate housing. The center body is a hollow body structure defining a center body airflow passage therethrough, a first fluid passage is partially defined between an outer surface of the inner housing and an inner surface of the intermediate housing, a second fluid passage is partially defined within the intermediate housing, and a third fluid passage comprises the center body airflow passage, an inner airflow passage defined between an exterior surface of the center body and an interior surface of the inner housing, and an outer airflow passage that is defined by the outer housing and radially outward from the intermediate housing.

In addition to one or more of the features described above, or as an alternative, further embodiments of the turbine engines may include that the center body comprises inner path vanes arranged on the exterior surface thereof, the inner path vanes arranged within the inner airflow passage to impart a swirl to a fluid passing therethrough.

In addition to one or more of the features described above, or as an alternative, further embodiments of the turbine engines may include that the center body includes an open first end and a partially obstructed second end having an impingement plate and an effusion plate.

In addition to one or more of the features described above, or as an alternative, further embodiments of the turbine engines may include that the intermediate housing includes a gas swirler vane assembly arranged within the second fluid passage to impart a swirl to a fluid passing through the second fluid passage.

In addition to one or more of the features described above, or as an alternative, further embodiments of the turbine engines may include that the second fluid passage comprises an accelerating passage at an outlet of the second fluid passage.

In addition to one or more of the features described above, or as an alternative, further embodiments of the turbine engines may include that the outer housing includes one or more outer path vanes arranged within the outer airflow passage to impart a swirl to a fluid passing through the outer airflow passage.

In addition to one or more of the features described above, or as an alternative, further embodiments of the turbine engines may include that the first fluid passage is configured to receive a liquid fuel, the second fluid passage is configured to receive a gaseous fuel, and the third fluid passage is configured to receive compressed air from the compressor section.

In addition to one or more of the features described above, or as an alternative, further embodiments of the turbine engines may include that the liquid fuel comprises water and the gaseous fuel comprises hydrogen.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
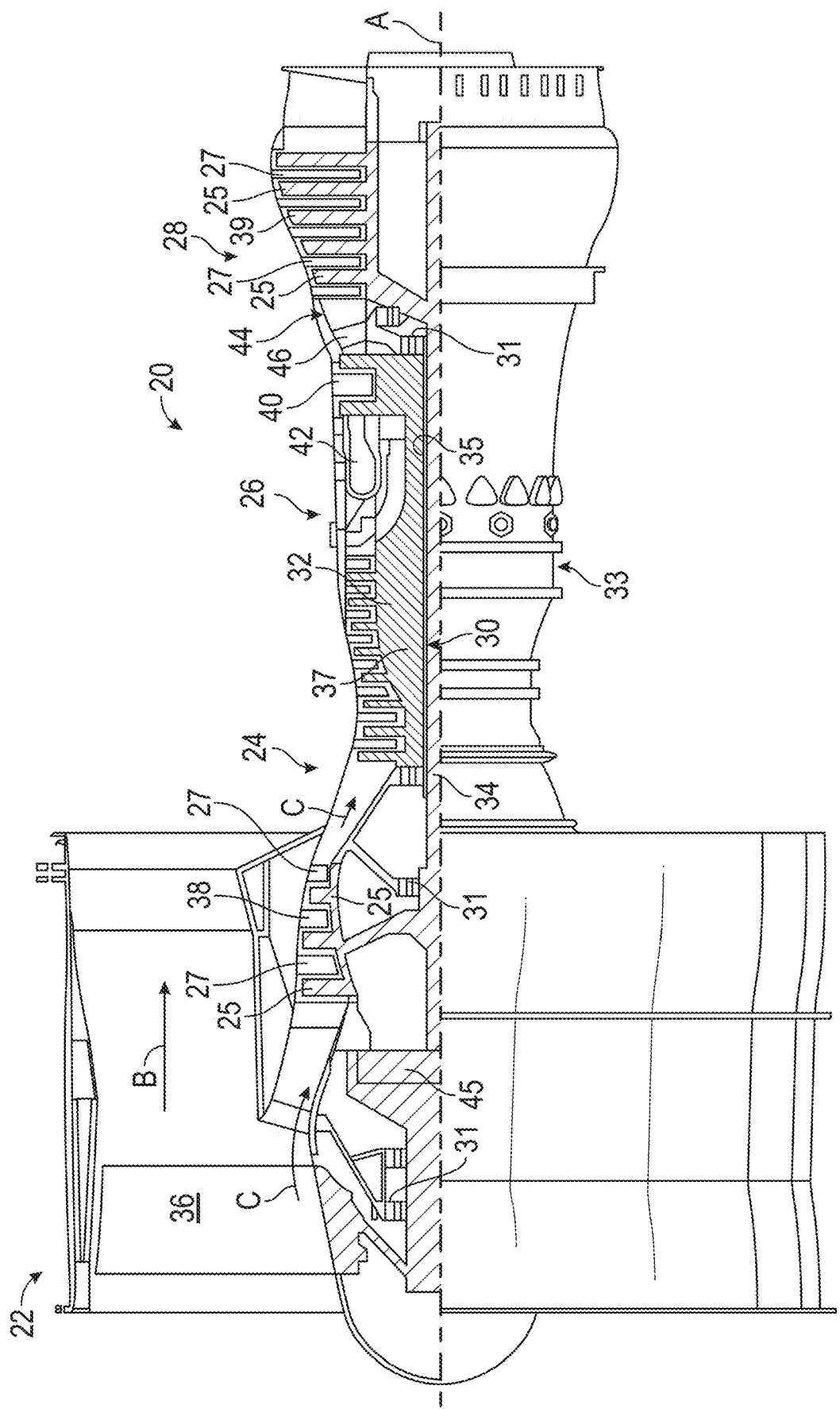
FIG. 1 is a schematic cross-sectional illustration of an aircraft turbine engine that may incorporate embodiments disclosed herein.

FIG. 1 schematically illustrates a gas turbine engine 20. The illustrative, example gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. The core flow path C directs compressed air into the combustor section 26 for combustion with a fuel. Hot combustion gases generated in the combustor section 26 are expanded through the turbine section 28. Although depicted as a turbofan gas turbine engine, it should be understood that the concepts described herein are not limited to turbofan engines and these teachings could extend to other types of engines.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded across the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, a bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In an embodiment of the gas turbine engine 20, a significant amount of thrust may be provided by the bypass flow path B due to the high bypass ratio. The fan section 22 of the gas turbine engine 20 is designed for a particular flight condition—typically cruise at about 0.8 Mach and about 35,000 feet (10,668 meter). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(T_{ram} °R)/(518.7° R)]^{0.5}$, where $T_{ram}$ represents the ambient temperature in degrees Rankine. The Low Corrected Fan Tip Speed according to one non-limiting embodiment of the example gas turbine engine 20 is less than about 1150 feet per second (fps) (351 meters per second (m/s)).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 2:
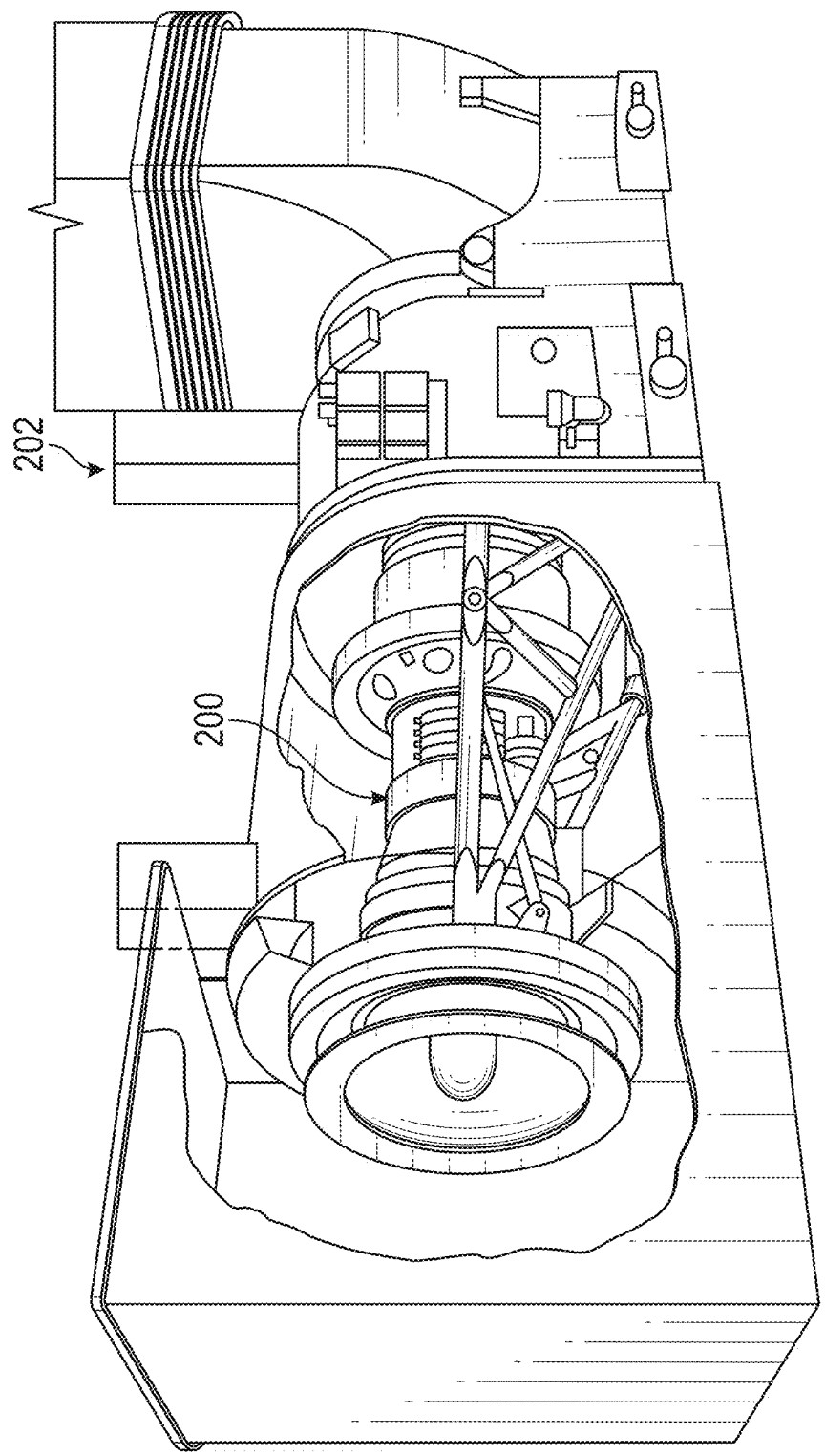
FIG. 2 is a schematic illustration of an industrial turbine engine that may incorporate embodiments of the present disclosure.

FIG. 2 illustrates an industrial turbine engine architecture 200 that is located within an enclosure 202. The industrial turbine engine architecture 200 may be similar to that shown and described above with respect to FIG. 1. The industrial turbine engine architecture 200 may be configured with embodiments and features described herein.

Figure 3:
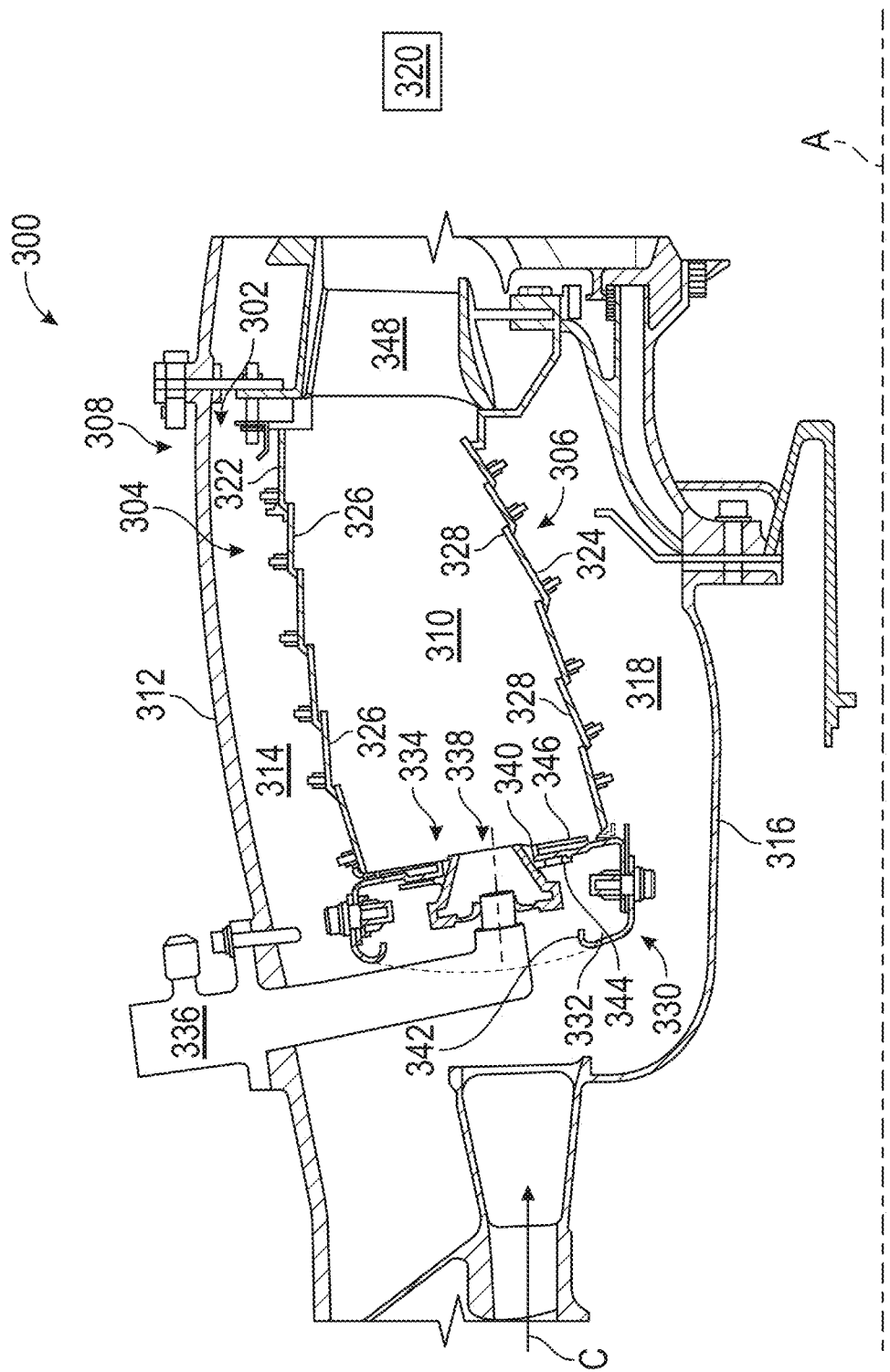
FIG. 3 is a schematic illustration of a combustion section of a turbine engine that may incorporate embodiments of the present disclosure.

Turning now to FIG. 3, a combustor section 300 for use in an aircraft or industrial turbine engine is schematically shown. The combustor section includes a combustor 302 with an outer combustor wall assembly 304, an inner combustor wall assembly 306, and a diffuser case 308. The outer combustor wall assembly 304 and the inner combustor wall assembly 306 are spaced apart such that a combustion chamber 310 is defined therebetween. The combustion chamber 310 may be generally annular in shape.

The outer combustor wall assembly 304 is spaced radially inward from an outer diffuser case 312 of the diffuser case 308 to define an outer annular plenum 314. The inner combustor wall assembly 306 is spaced radially outward from an inner diffuser case 316 of the diffuser case 308 to define an inner annular plenum 318. It should be understood that although a particular combustor arrangement is illustrated, other combustor types, such as can combustors, with various combustor liner/wall arrangements will also benefit from embodiments of the present disclosure.

The combustor wall assemblies 304, 306 contain the combustion products for direction toward a turbine section 320 of a turbine engine. Each combustor wall assembly 304, 306 generally includes a respective support shell 322, 324 which supports one or more liner panels 326, 328, respectively mounted to a hot side of the respective support shell 322, 324. Each of the liner panels 326, 328 may be generally rectilinear and manufactured of, for example, a nickel based super alloy, ceramic or other temperature resistant material and are arranged to form a liner array. In one disclosed non-limiting embodiment, the liner array may include a multiple of forward liner panels and a multiple of aft liner panels that are circumferentially staggered to line the hot side of the outer support shell 322. A multiple of forward liner panels and a multiple of aft liner panels may be circumferentially staggered to line the hot side of the inner shell 324.

The combustor 302 further includes a forward assembly 330 immediately downstream of a compressor section of the engine to receive compressed airflow therefrom. The forward assembly 330 generally includes an annular hood 332 and a bulkhead assembly 334 which locate a multiple of fuel nozzles 336 (one shown) and a multiple of swirlers 338 (one shown). Each of the swirlers 338 is mounted within an opening 340 of the bulkhead assembly 334 to be circumferentially aligned with one of a multiple of annular hood ports 342. Each bulkhead assembly 334 generally includes a bulkhead support shell 344 secured to the combustor wall assembly 304, 306, and a multiple of circumferentially distributed bulkhead liner panels 346 secured to the bulkhead support shell 344.

The annular hood 332 extends radially between, and is secured to, the forwardmost ends of the combustor wall assemblies 304, 306. The annular hood 332 forms the multiple of circumferentially distributed hood ports 342 that accommodate the respective fuel nozzle 336 and introduce air into the forward end of the combustion chamber 310. Each fuel nozzle 336 may be secured to the diffuser case module 308 and project through one of the hood ports 342 and the respective swirler 338.

In operation, the forward assembly 330 introduces core combustion air into the forward section of the combustion chamber 310 while the remainder enters the outer annular plenum 314 and the inner annular plenum 318. The multiple of fuel nozzles 336 and adjacent structure generate a blended fuel-air mixture that supports stable combustion in the combustion chamber 310.

Opposite the forward assembly 330, the outer and inner support shells 322, 324 are mounted to a first row of Nozzle Guide Vanes (NGVs) 348. The NGVs 348 are static engine components which direct the combustion gases onto turbine blades in a turbine section of the engine to facilitate the conversion of pressure energy into kinetic energy. The combustion gases are also accelerated by the NGVs 348 because of a convergent shape thereof and are typically given a "spin" or a "swirl" in the direction of turbine rotation.

Although FIG. 3 is illustrative of a specific combustor section configuration, those of skill in the art will appreciate that other combustor configurations may benefit from embodiments of the present disclosure. For example, can combustors, annular combustors, can-annular combustors, and other types of combustors may implement or be configured with embodiments of the present disclosure.

Figure 4A:
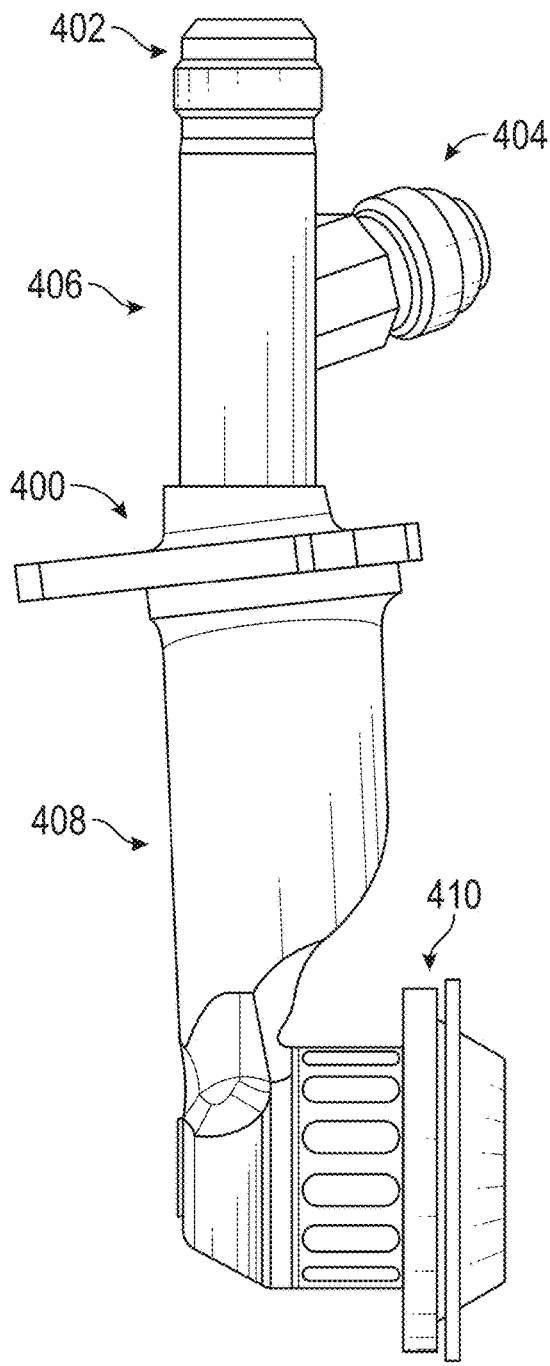
FIG. 4A is a side elevation view of a nozzle assembly that may incorporate embodiments of the present disclosure.
Figure 4B:
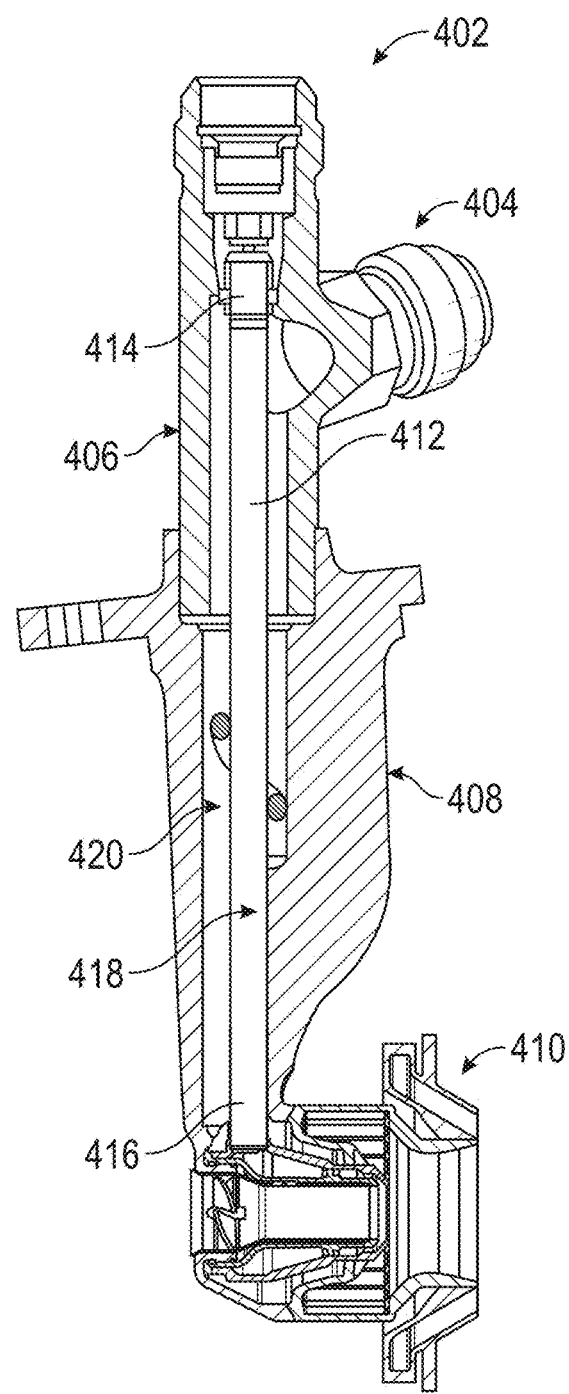
FIG. 4B is a cross-sectional view of the nozzle assembly of FIG. 4A.

Referring now to FIGS. 4A-4B, schematic illustrations of a fuel injector 400 for use in combustors and combustor sections of turbine engines and in accordance with embodiments of the present disclosure are illustratively shown. The fuel injector 400 may be implemented in the above described combustors and engine configurations, and variations thereon. FIG. 4A illustrates a side elevation view of the fuel injector 400 and FIG. 4B illustrates a cross-sectional view of the fuel injector 400.

As shown, the fuel injector 400 includes a first inlet 402 and a second inlet 404 defined by an inlet housing 406, a support housing 408, and a nozzle assembly 410. In some embodiments, and as shown, the first inlet 402 is arranged transverse to the second inlet 404. The inlet housing 406 is received within the support housing 408 and a tube 412 extends through the housings 406, 408 (e.g., as shown FIG. 4B).

The first inlet 402 may receive a first fluid such as a liquid and the second inlet 404 may receive a second fluid such as a gas. The fuel injector 400 provides for concentric passages for the first fluid and the second fluid. For example, in some embodiments, the first fluid may be a liquid state of Jet-A, diesel, JP8, water and combinations thereof, and the second fluid may be a gas, such as natural gas or methane. Each of the fluids are communicated through separate concentric passages within the fuel injector 400 such that gas turbine engine readily operates on either fuel or combinations thereof. For example, in the illustrative embodiment, the tube 412 provides a barrier between the first fluid (e.g., within the tube 412 and sourced from the first inlet 402) and the second fluid (e.g., in a space around the tube 412 and sourced from the second inlet 404). As noted, the first fluid may be in a liquid state and the second fluid may be in a gaseous state.

The tube 412 is secured within the inlet housing 406 at a first end 414 and secured in or to the nozzle assembly 410 at a second end 416. The connection at the first end 414 may include a seal, such as an O-ring, or the like. The connection at the second end 416 may be via a braze, weld, thread, or other attachment to the nozzle assembly 410. The tube 412 defines a first fluid passage 418 within the tube 412 and a second fluid passage 420 defined between an exterior surface of the tube 412 and an interior surface of the housings 406, 408. The second fluid passage 420 may be an annular passage that surrounds the tube 412 along a length of the fuel injector 400. The second fluid passage 420 defined within the housings 406, 408 and around the tube 412 provides for a buffer or heat shield to minimize or prevent coking of the fluid passing through the first fluid passage 418 within the tube 412. The first fluid and the second fluid may be mixed and joined together at the nozzle assembly 410.

Figure 5:
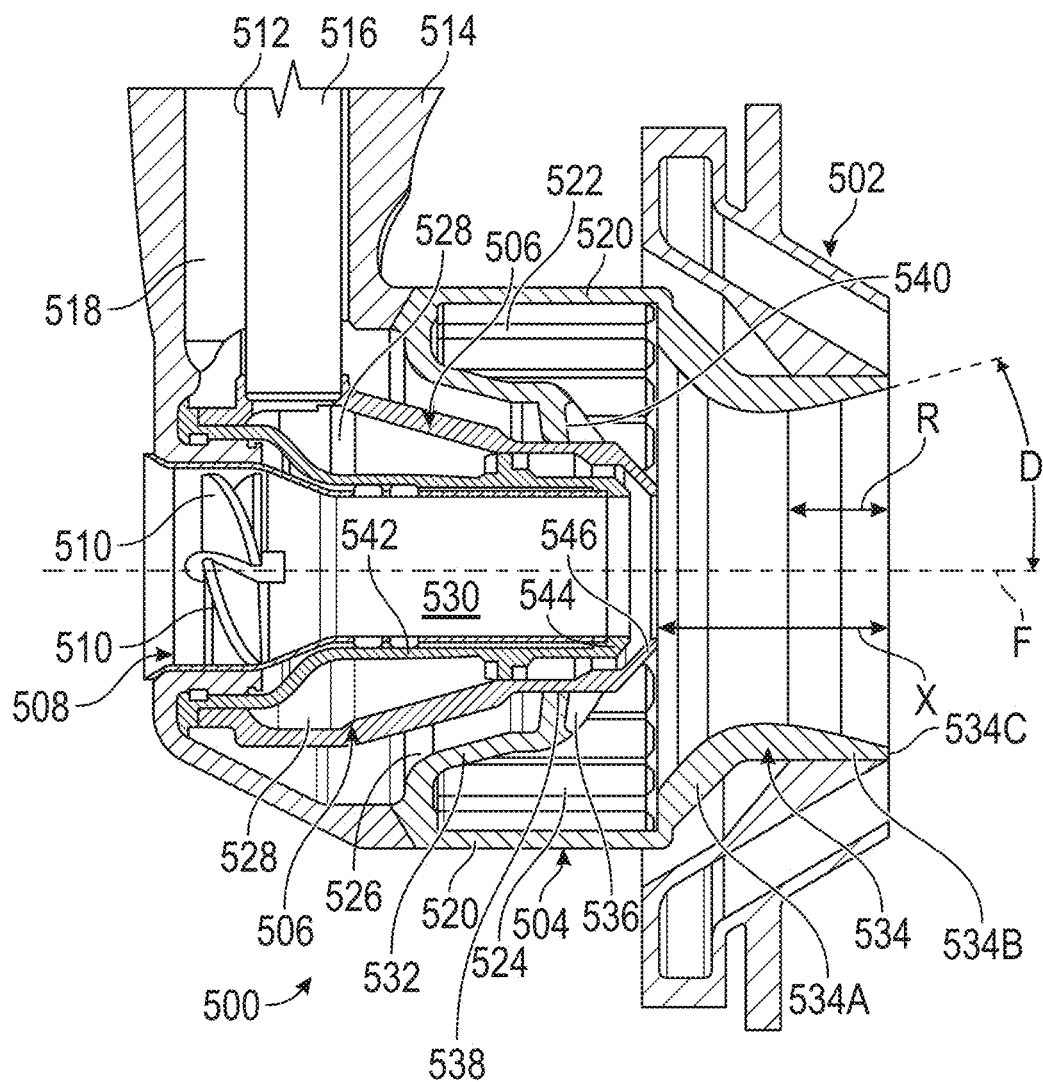
FIG. 5 is a schematic illustration of a nozzle assembly that may incorporate embodiments of the present disclosure.

Referring now to FIG. 5, a schematic cross-sectional view of a nozzle assembly 500. The nozzle assembly 500 includes a swirler 502 with various components arranged within and relative to the swirler 502. The nozzle assembly 500 includes an outer air swirler 504, an inner air swirler 506, and an air inflow tube 508 with a helical inflow vane assembly 510 arranged along a nozzle axis F. The nozzle assembly 500 includes a structure similar to the fuel injector described above, with a tube 512 arranged within a housing 514 and defining a first fluid passage 516 and a second fluid passage 518.

An outer wall 520 of the outer air swirler 504 includes a multiple of axial slots 522 which receive airflow therethrough. An outer annular air passage 524 is defined around the axis F and within the outer air swirler 504. An annular fuel gas passage 526 is defined around the axis F and between the outer air swirler 504 and the inner air swirler 506. The annular fuel gas passage 526 receives fluid (e.g., gaseous fuel) from within the second fluid passage 518. An annular liquid passage 528 is defined around the axis F and within the inner air swirler 506. The annular liquid passage 528 receives fluid (e.g., liquid fuel) from the first fluid passage 516 of the tube 512. A central air passage 530 is defined along the axis F within the air inflow tube 508.

The outer annular air passage 524 is generally defined between the outer wall 520 and an inner wall 532 of the outer air swirler 504. An end section 534 of the outer wall 520 extends beyond an end section 536 of the inner wall 532 and the annular liquid passage 528. The end section 534 of the outer wall 520 includes a convergent section 534A that transitions to a divergent section 534B and terminates at a distal end 534C. That is, the end section 534 defines a convergent-divergent nozzle with an essentially asymmetric hourglass-shape downstream of the inner air swirler 506 and the air inflow tube 508.

In one illustrative and non-limiting embodiment, the divergent section 534B defines an angle D of between about zero to thirty (0-30) degrees with respect to the axis F. The end section 534 defines a length X which. The length X, in this non-limiting example, may be about 0-0.75 inches (0-19 mm) in length along the axis F with a filming region R of about 0-0.4 inches (0-10 mm). That is, the length of the filming region R defines from about 0-55% of the length X of the end section 534. The filming region R may extend to the distal end 534C of the divergent section 534B. It should be appreciated that various other geometries of the outer air swirler 504 may benefit from embodiments described herein.

The end section 536 of the inner wall 532 abuts an outer wall 538 of the inner air swirler 506 to defines a multiple of angled slots or vanes 540, which may be arranged and oriented as skewed slots to form an axial swirled exit for the annular gas passage 526. That is, the annular gas passage 526 terminates with the multiple of angled slots 540 to direct the fuel gas axially and imparts a swirl thereto. In other embodiments, the annular gas passage 526 may terminates with a multiple of openings that are generally circular passages. It should be appreciated that other geometries may alternatively be provided without departing from the scope of the present disclosure. The annular gas passage 526 communicates essentially all, e.g., about one hundred (100) percent of the fuel gas through the multiple of angled slots 540. The multiple of angled slots 540 will decrease the injection area and increase axial swirl momentum to increase circumferential uniformity and total air swirl due to the angle of gas injection and increase in air stream mixing downstream of the nozzle assembly 500 to facilitate fuel-air mixing. Each of the multiple of angled slots 540 may be arranged as skewed quadrilaterals in shape. In some such embodiments, the multiple of angled slots 540 may be skewed at an angle between about fifty to sixty degrees (50°-60°) around the axis F. The outer wall 538 and an inner wall 542 of the inner air swirler 506 define the annular liquid passage 528. An end section 544 of the outer wall 538 and an end section 546 of the inner wall 542 may be turned radially inward toward the axis F to direct the liquid at least partially radially inward.

The air inflow tube 508 is mounted within the inner wall 542 and includes the upstream helical inflow vane assembly 510 to swirl an airflow passing therethrough. Due in part to the swirled airflow through the air inflow tube 508, the liquid spray expands from the annular liquid passage 528 and impacts upon the filming region R to re-film/re-atomize the fluids as they are injected into a combustion chamber. The increased liquid injection recession causes large drops to re-film/re-atomization on the larger wall surface of the divergent section 534B, resulting in smaller drop size and higher penetration which increases a water vaporization rate as well as positioning water in desirable locations for the combustion process. The reduced water drop size and the effective utilization of water facilitates a decrease in NOx emissions with reduced water injection (i.e. lower water-to-fuel ratio).

The above described fuel injector may be useful for dual-fuel operation (e.g., No. 2 Fuel Oil and Methane) with water injection to reduce NOx. For example, water may be provided through the first inlet and the tube and mixed with a gas fuel, or water may be mixed with a liquid fuel (e.g., Jet A, No. 2 Fuel Oil, etc.). The gas fuel may be methane or propane, and in some embodiments a mixture of methane and hydrogen may be provided through the second inlet and passed through the second fluid passage around the tube. It may be advantageous to increase the amount of hydrogen that is used in such systems, such as mixing the hydrogen with methane at very high levels up to and including 100% hydrogen (e.g., no methane at the maximum configuration). However, because of the high flame speeds and reaction rates of hydrogen, flashback can occur at high pressure and temperature allowing the flame to attach on the gas fuel swirl vanes causing damage (e.g., angled slots 540). That is, by increasing the amount of hydrogen within the gas fuel, flashback or other negative impacts may occur.

Figure 6:
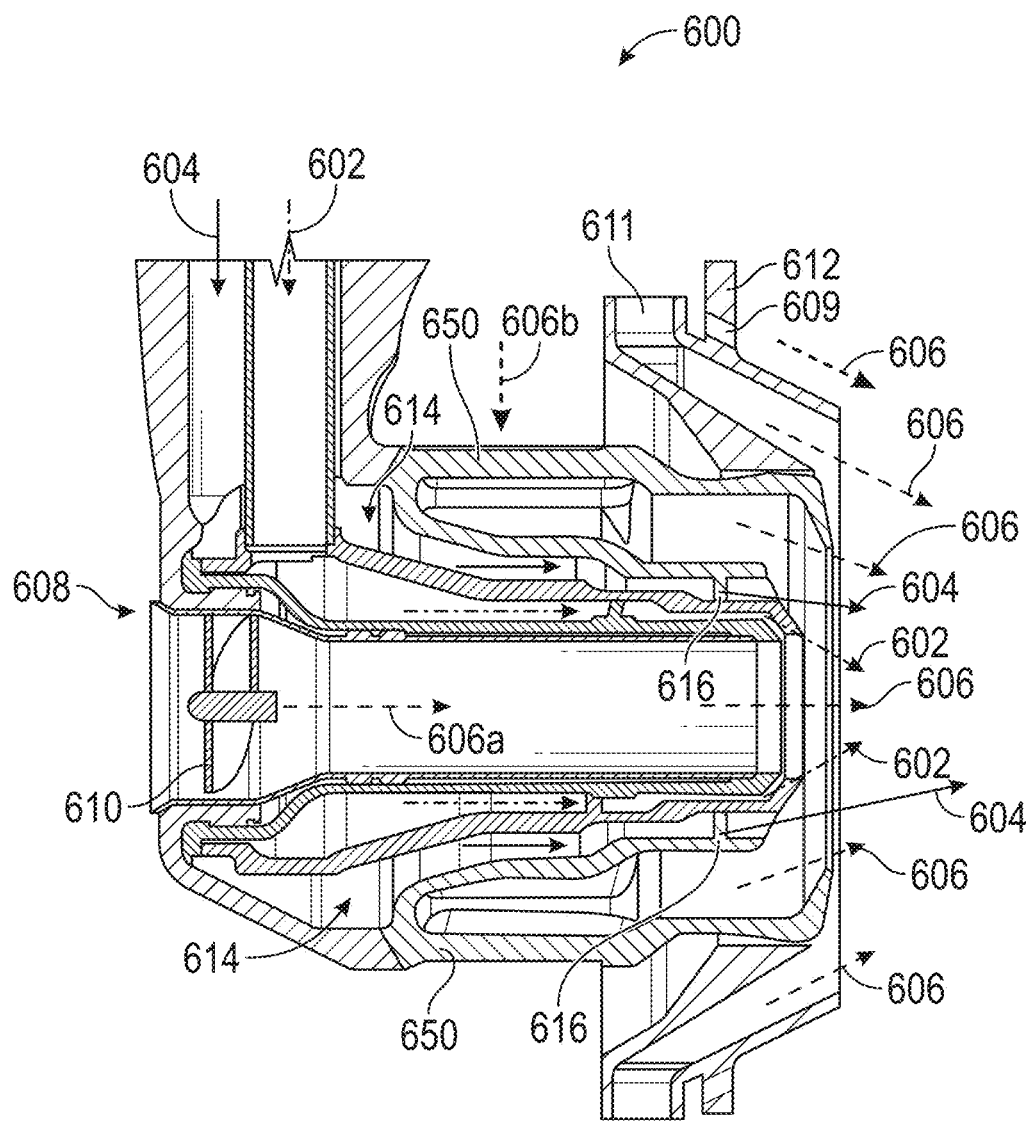
FIG. 6 is a schematic illustration showing fluid flow through a nozzle assembly.

For example, referring now to FIG. 6 a schematic illustration of flow of fluids through a nozzle assembly 600 in accordance with an embodiment of the present disclosure is shown. The nozzle assembly 600 may be similar to that shown and described above, providing dual-fuel injection of fuel into a combustion chamber of a turbine engine. A first fluid 602 is provided through a first fluid passage and a second fluid 604 is provided through a second fluid passage, as described above. Air may be introduced to the system to swirl, mix, and provide oxygen for the combustion process. In FIG. 6, the air is indicated as a third fluid 606. The third fluid 606 (e.g., air) may be supplied into the nozzle assembly 600 through an air inflow tube 608. The air within the air inflow tube 608 may be swirled or rotated as it passes over or through a helical inflow vane assembly 610. As the fuel fluids 602, 604 (e.g., gas and liquid) are passed through the nozzle assembly 600, the flows will be joined together and mixed with the third fluid 606 (air). Some of the air 606 may be directed through a swirler 612 arranged at the outlet of the nozzle assembly 600.

As shown, the second fluid 604 may be passed through an annular gas passage 614. As the second fluid 604 reaches the outlet end of the nozzle assembly 600, it will be passed through a plurality of angled slots 616. The angled slots 616 may be defined by vanes or other angled walls that are configured to rotate and swirl the second fluid 604 as it is mixed with the other fluids 602, 606. When hydrogen is introduced into the second fluid 604 (e.g., mixture of hydrogen with other fuel, or hydrogen only), the hydrogen may be disrupted at the angled slots 616 and cause vane wakes that can negatively impact the nozzle assembly 600 and/or the combustion provided thereby.

Figure 7A:
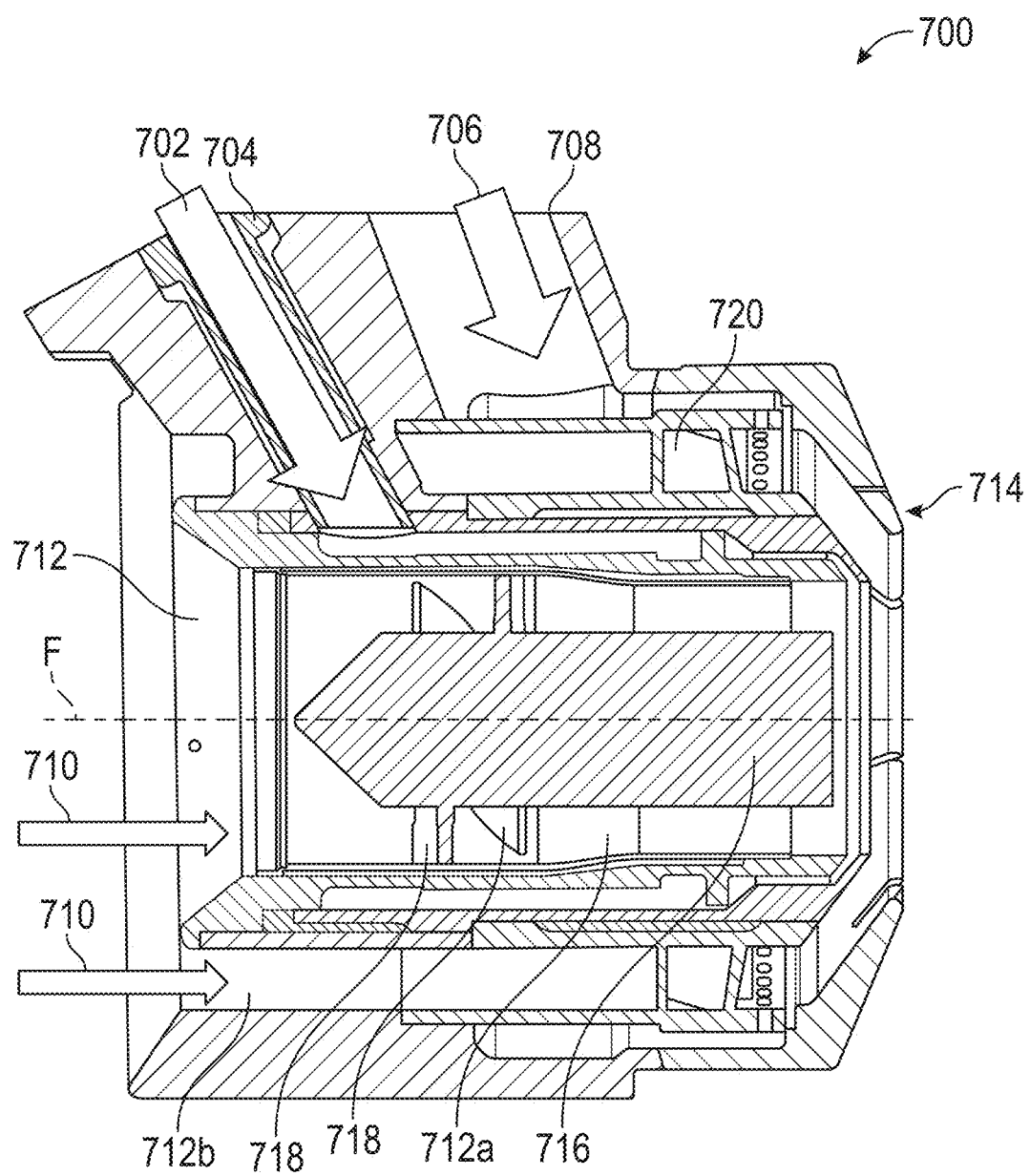
FIG. 7A is a schematic illustration of a nozzle assembly.
Figure 7B:
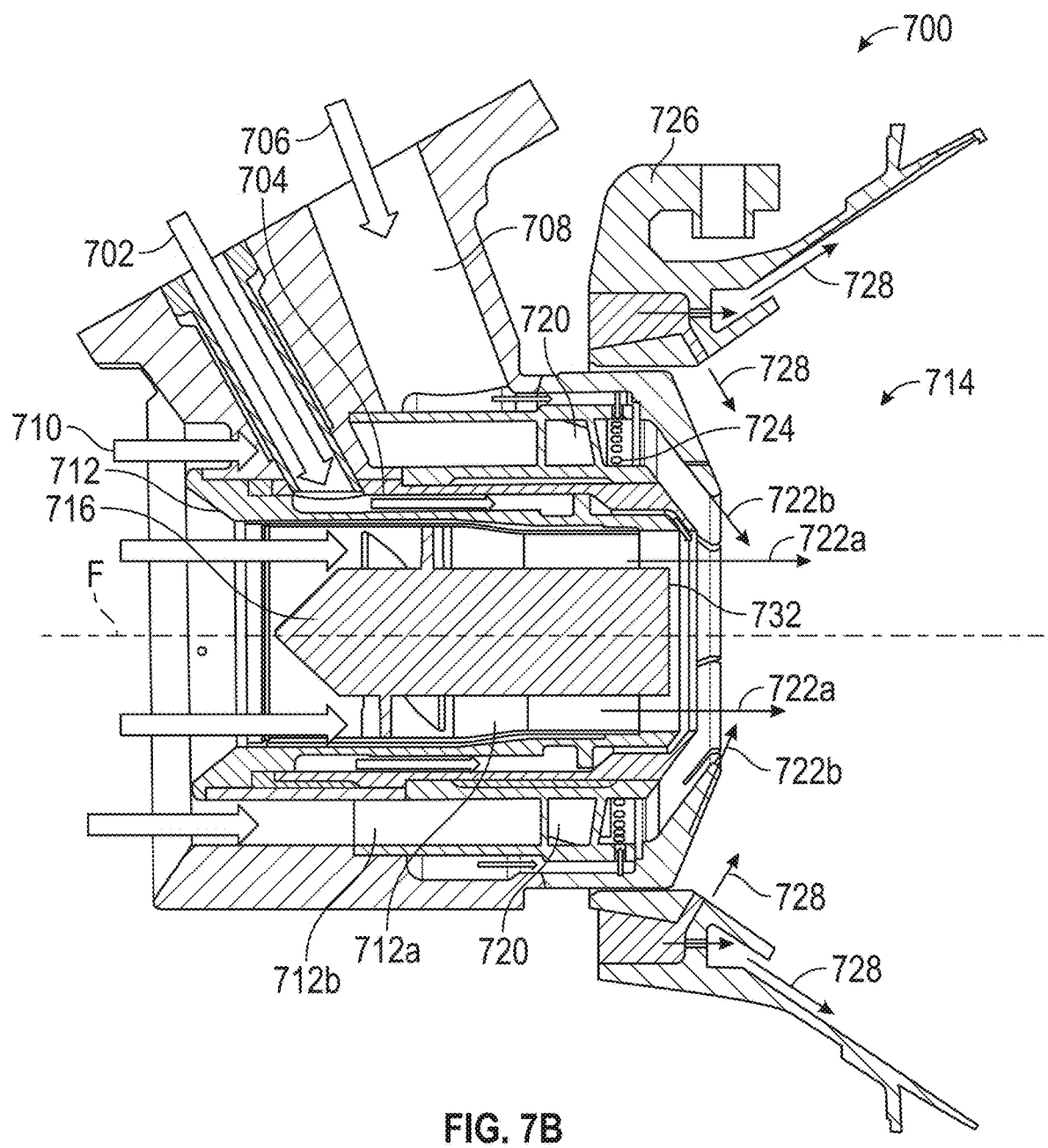
FIG. 7B illustrates flow paths of fluids through the nozzle assembly of FIG. 7A.
Figure 7C:
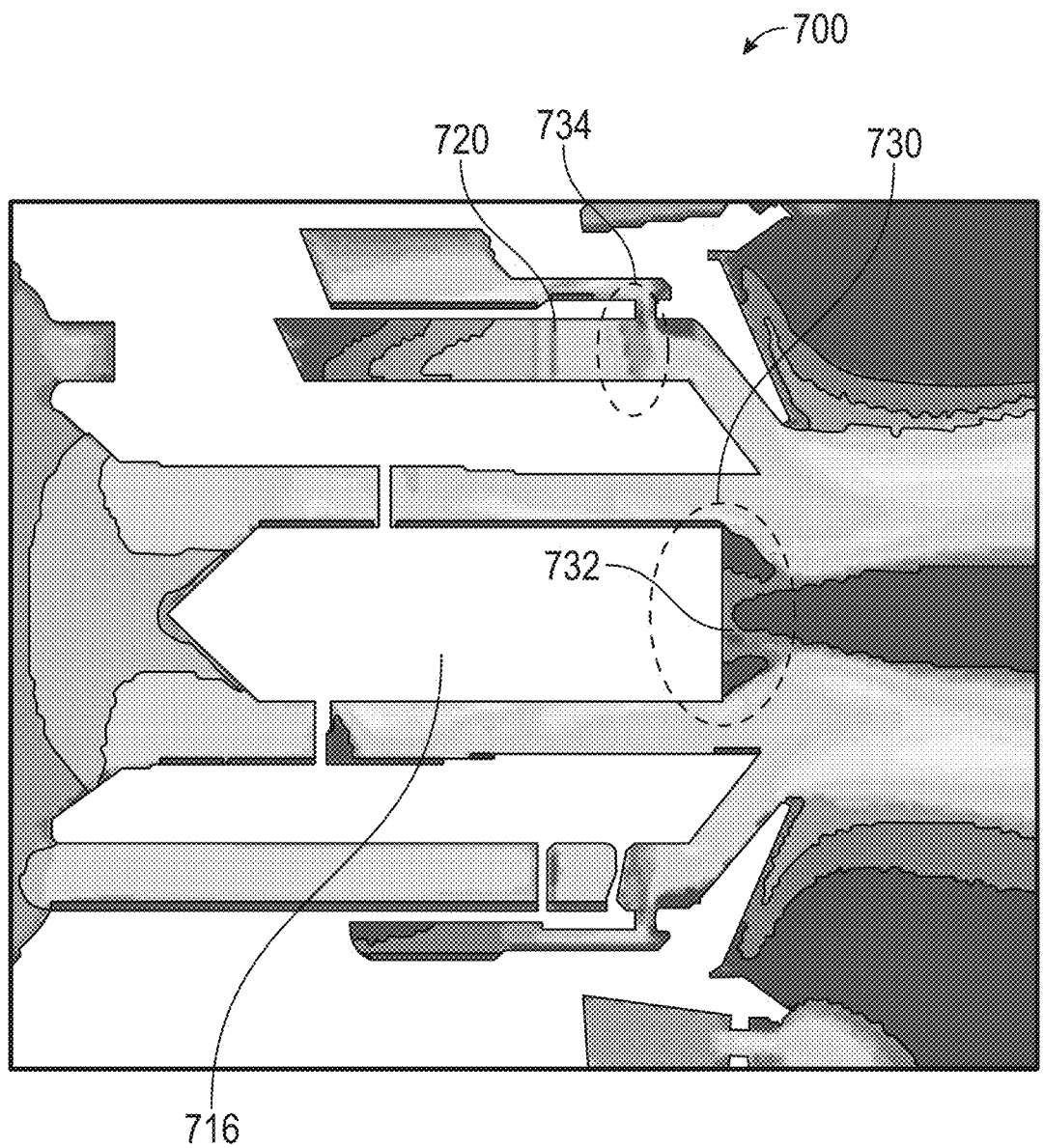
FIG. 7C illustrates flow velocities of fluids through the nozzle assembly of FIG. 7A.

Referring now to FIGS. 7A-7C, schematic illustrations of a nozzle assembly 700 are shown. The nozzle assembly 700 may be similar to that shown and described above, and thus similar features may not be labeled or described in further detail. The nozzle assembly 700 is configured to receive a first fluid 702 through a first fluid passage 704, a second fluid 706 through a second fluid passage 708, and a third fluid 710 through a third fluid passage 712. In this configuration, the first and second fluid passages 704, 708 are structurally separate, as compared to the above described embodiments where the second fluid passage is arranged within the first fluid passage, however, the functionality thereof is substantially the same, as the first and second fluids will be mixed at an outlet 714 of the nozzle assembly 700.

In this configuration, the third fluid passage 712 is an air inflow tube having a center body 716 installed therein. The center body 716 includes one or more inner path vanes 718 arranged about an exterior of the center body 716. The center body 716 is positioned within the third fluid passage to swirl and direct part of the third fluid 710 toward the radially outward edges of the third flow passage 712. The center body 716 may be provided to stabilize a flame at the outlet 714 of the nozzle assembly 700. The inner path vanes 718 of the center body 716 will cause the flow to transition from an axial flow along an axis F of the nozzle assembly 700 to a circumferential or tangential flow and thus impart or induce a swirl within the third fluid. In this configuration, the third flow passage 712 is separated into two flows (e.g., 712a, 712b). As shown, an inner airflow passage 712a is defined between an exterior of the center body 716 and an inner wall of the third flow passage 712 and an outer airflow passage 712b is arranged or defined radially outward therefrom. As noted, a swirl may be introduced to the third fluid 710 by the inner path vanes 718 of the center body 716. The inner path vanes 718 are arranged within the inner airflow passage 712a and obstruct and impart a swirl to a portion of the third fluid 710 passing through the inner airflow passage 712a. In the outer airflow passage 712b, the third fluid 710 may be rotated or swirled as it passes through outer path vanes 720 proximate the outlet 714. This swirling at the outer path vanes 720 may serve to impart a swirl or rotation to the second fluid 706 as the flow enters the region of the outlet 714.

FIG. 7B illustrates the flow of fluids through the nozzle assembly 700. As shown, the first fluid 702 will be supped through the first fluid passage 704. The first fluid passage 704 will extend along a tube or the like, and then the first fluid 702 will enter the nozzle assembly 700 and turn to an axial flow in a direction along the axis F. The first fluid passage 704 is defined, in part, by a wall of the third fluid passage 712, and in this embodiment is arranged radially inward (relative to the axis F) from the outer airflow passage 712b. The first fluid 702 will be injected into a combustion chamber at the outlet 714 between an outlet flow of the inner airflow passage 712a and an outlet flow of the outer airflow passage 712b. As each of the inner airflow passage 712a and the outer airflow passage 712b include swirling elements (inner path vanes 718 and outer path vanes 720), the first fluid 702 will be swirled and mixed with the third fluid 710. That is, an inner air flow 722a and an outer air flow 722b of the third fluid 710 will mix with the first fluid 702 at the outlet 714. In this configuration, the second fluid 706 will travel along the second fluid passage 708 and be radially injected into the outer airflow passage 712b downstream of the outer path vanes 720 through apertures 724, and thus be swirled. Further, because the second fluid 706 is mixed with the third fluid 710 in the outer flow passage 712b, the three fluids 702, 706, 710 will mix at the outlet 714 of the nozzle assembly 700. As shown in FIG. 7B, a swirler guide assembly 726 may be provided to direct cooling air 728 about the outlet 714 of the nozzle assembly 700.

As the three fluids are mixed and swirled at the outlet 714, the mixing and swirling fluids may be combusted. The center body 716 provides for a mechanism to increase a flow velocity of the third fluid 710 passing through the inner airflow passage 712a. It may be advantageous to have hydrogen mixed into or form the entirety of the second fluid 706. However, due to the properties of hydrogen, a recirculation of the mixture of fluids at the outlet 714 and/or wakes from vanes 720 and the like in various flow paths may cause excessive temperatures within the nozzle assembly 700.

For example, as shown in FIG. 7C, a flow diagram illustrates a low velocity region 730 at an end wall 732 of the center body 716. A low velocity region 734 also exists at the location where the second fluid is injected into the third fluid downstream of the outer path vanes 720. These low velocity regions 730, 734 may allow for the hydrogen to attach, stagnate, and potentially combust at locations within the nozzle assembly 700, rather than in a combustion chamber.

Figure 8A:
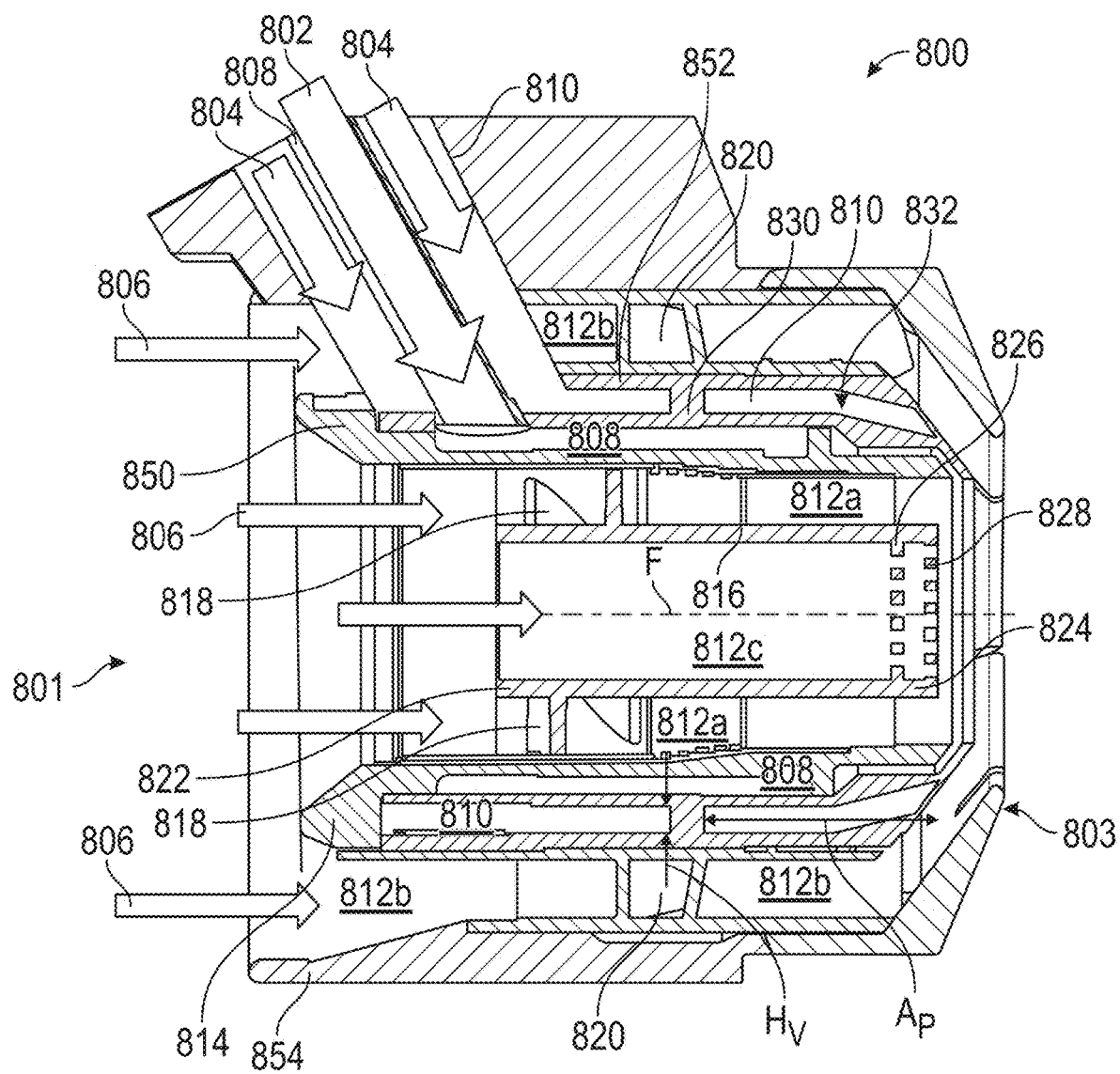
FIG. 8A is a schematic illustration of a nozzle assembly in accordance with an embodiment of the present disclosure.
Figure 8B:
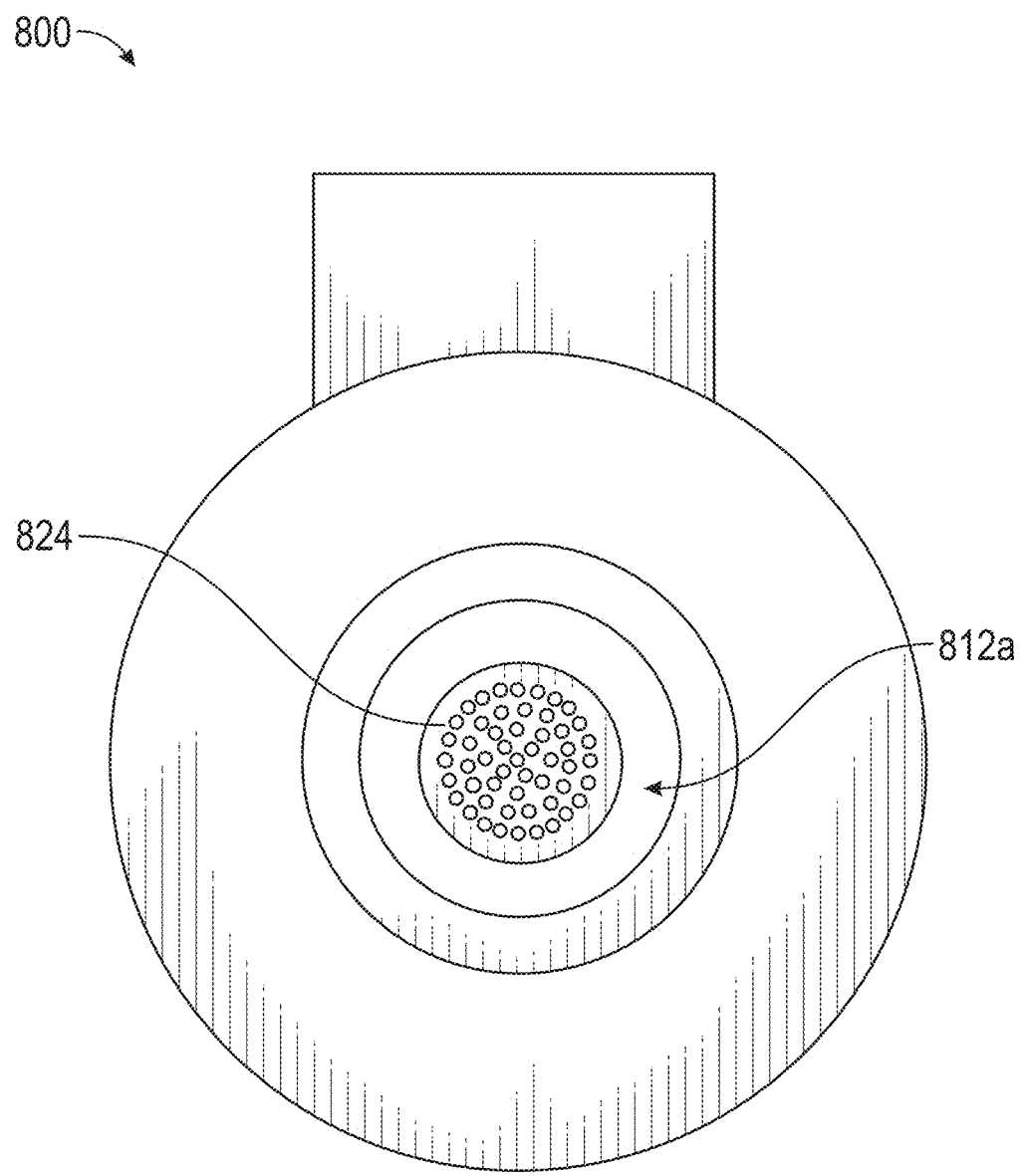
FIG. 8B illustrates an end-on view of the nozzle assembly of FIG. 8A.
Figure 8C:
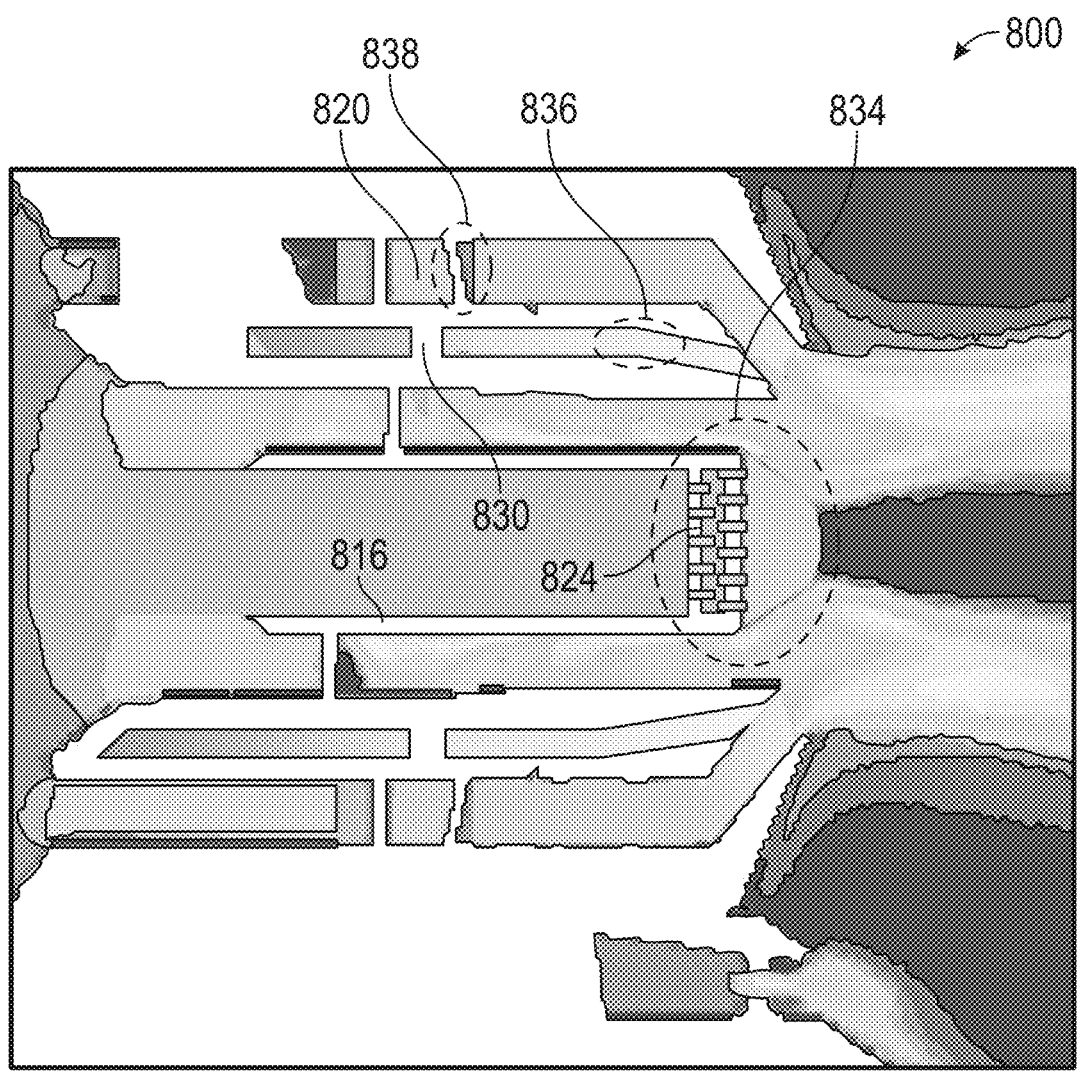
FIG. 8C illustrates flow velocities of fluids through the nozzle assembly of FIG. 8A.

Turning now to FIGS. 8A-8C, schematic illustrations of a nozzle assembly 800 in accordance with an embodiment of the present disclosure are shown. The nozzle assembly 800 is a multi-fluid combustor nozzle assembly for use in a turbine engine system. The nozzle assembly 800 is configured to mix three fluids, including a first fluid 802 (e.g., a liquid fuel), a second fluid 804 (e.g., a gaseous fuel), and a third fluid 806 (e.g., air). The first fluid 802 is provided along a first fluid passage 808, the second fluid 804 is provided along a second fluid passage 810, and the third fluid 806 is provided along a third fluid passage 812 (labeled as 812a, 812b, 812c) defined within an air inflow tube 814.

In this embodiment, a center body 816 is arranged within the air inflow tube 814. Similar to the embodiment of FIGS. 7A-7C, the center body 816 includes inner path vanes 818 that are arranged to swirl a portion of the third fluid that flows along an inner airflow passage 812a. The third fluid 806 will also flow along an outer airflow passage 812b, which includes outer path vanes 820 configured to swirl the air in the outer airflow passage 812b. In this embodiment, rather than a solid body (as in the embodiment of FIGS. 7A-7C), the center body 816 is a hollow body structure that defines a center body airflow passage 812c therethrough. As such, the center body 816 includes an open first end 822 and a partially open, airflow cooled second end 824 such that airflow may enter the center body 816 at the first end 822, flow through an interior of the center body 816, and exit through/out the second end 824. The second end 824, in this embodiment, includes a double-walled configuration, with an impingement plate 826 and an effusion plate 828 arranged at the second end 824 of the center body 816. That is, the second end 824 includes an air cooled array of impingement holes in the impingement plate 826 and effusion cooling holes in the effusion plate 828 at the downstream end (second end 824) of the center body 816. The impingement plate 826 includes a plurality of apertures that are arranged to direct the airflow to impinge upon the effusion plate 828 and provide impingement cooling thereto. The effusion plate 828 similarly includes a plurality of apertures, and directs an effusion flow of air out the second end 824 of the center body 816. As result of the open first end 822 and the air cooled second end 824 of the center body 816, the nozzle assembly 800 includes a substantially non-swirled, axial flow of air along an axis F of the nozzle assembly 800. This axial flow through the center body 816 will be substantially unswirled as it exits the center body 816 through the effusion plate 828, and thus may be able to push any fuel components (e.g., hydrogen) or high temperature gases away from the effusion plate 828 to thus reduce metal temperatures thereof.

In addition to the hollow body center body 816, the nozzle assembly 800 includes a modified flow path for the second fluid 804. In this embodiment, the second fluid passage 810 is similar to the configuration of FIGS. 4A-6, with the second fluid passage 810 being defined around the first fluid passage 808. Further, the second fluid passage 810 enters the nozzle assembly 800 and is arranged radially inward from the outer airflow passage 812b and is arranged parallel with the axis F. The second fluid passage 810, in this embodiment, includes a vane swirler assembly 830 that imparts a swirl to the second fluid 804. The second fluid 804 may then pass through an accelerating passage 832 downstream from the vane swirler assembly 830, prior to injection at the outlet 803 of the nozzle assembly 800 to be mixed with the other fluids 802, 806. The accelerating passage 832 of the second fluid passage 810 allows the flow of the second fluid 804 to mix out makes caused by the vane swirler assembly 830, such that the flow of the second fluid 804 exits the second fluid passage 810 with a relatively uniform high velocity before it mixes with the third fluid 806 at the outlet 803 of the nozzle assembly 800. The accelerating passage 832 may be formed as a tapering passage where the cross-sectional area, in a flow direction, reduces in the axial direction. In accordance with some non-limiting embodiments, an axial length $A_p$ of the accelerating passage 832 is at least five (5) times longer than a radial height $H_v$ of the vane swirler assembly 830. This relatively long accelerating passage 832 allows for sufficient length or time for wakes formed from interaction with the vane swirler assembly 830 to mix out of the flow.

In a non-limiting example operation of the nozzle assembly 800, the first fluid 802 may be a liquid, such as water or a mixture of liquid fuel and water, the second fluid 804 may be a gas, such as methane, a methane/hydrogen mix, or hydrogen, and the third fluid 806 may be a gas, such as air (e.g., pressurized air from a compressor section of a turbine engine). In this embodiment, as compared to the embodiment of FIGS. 7A-7C, the gas fuel supply (second fluid passage 810) is arranged around the liquid fuel supply (first fluid passage 808). The gas fuel (second fluid 804) will be swirled within the second fluid passage 810 by means of the vane swirler assembly 830 and then accelerated through the accelerating passage 832. As such, the gaseous fuel (second fluid 804) will be ejected at the outlet 803 of the nozzle assembly 800 at a relatively high velocity. Additionally, the flow paths of the third fluid 806 are also different compared to the embodiment of FIGS. 7A-7C.

For example, the outer airflow passage 812b is moved radially outward relative to the first and second fluid passages 808, 810 within the nozzle assembly 800, as shown in FIG. 8A. As such, a portion of the third fluid 806 will be radially outward from the other fluids 802, 804 and may be injected radially inward at the outlet 803 of the nozzle assembly 800 to guide the flows of the fluids as they enter a combustion chamber for combustion. Along this outer airflow passage 812b, outer path vanes 820 are moved forward (relative to an engine axis) so that the length or distance from the outer path vanes 820 to an outlet of the outer airflow passage 812b at the outlet 803 of the nozzle assembly 800 is increased as compared to prior configurations. For example, in some non-limiting embodiments, the axial length of the outer airflow passage 812b from the outer path vanes 820 to the outlet 803 of the nozzle assembly 800 may be at least five (5) times a radial height of the outer path vanes 820. This increase length of the outer airflow passage 812b downstream of the outer path vanes 820 allows for wakes created by the outer path vanes 820 to mix out of the flow. To accommodate this outboard position and arrangement of fluid passages, an inlet 801 of the third fluid passage 812 (e.g., air inlet) may be enlarged to compensate for increased blockage caused by the second fluid passage 810 being arranged radially inward from the outer airflow passage 812*b*. That is, by increasing the size of the inlet 801, blockage caused by the radially inward second fluid passage 810 may be mitigated.

Additionally, the third fluid passage (collectively 812) includes the center body airflow passage 812*c* within the interior of the center body 816. The center body airflow passage 812*c* provides for a substantially axial flow with no swirl, that will exit through the downstream, second end 824 (e.g., through the impingement plate 826 and the effusion plate 828).

As shown in FIG. 8C, a flow diagram illustrates the increased flow velocities as compared to the prior configuration (e.g., shown in FIGS. 7A-7C). FIG. 8C illustrates the flow of fluids through and around the outer path vanes 820, the vane swirler assembly 830, and the downstream, second end 824 of the center body 816. As shown, regions 834, 836, 838 all indicate higher flow velocities than the configuration of FIGS. 7A-7C. For example, in a first region 834 at the partially obstructed second end 824 of the center body 816, a relatively high velocity dome of air that is ejected through the effusion plate 828 will prevent hydrogen from attaching to the end of the center body 816. The impingement plate 826 provides backside cooling to the effusion plate 828 to prevent the end of the center body 816 from reaching undesirable temperatures. Also shown, in a second region, a flow of gas through the accelerating passage 832 downstream of the vane swirler assembly 830 allows for increased velocity gas (e.g., hydrogen) that has relatively smooth flow, as the vane swirler assembly 830 is moved away from the outlet 803 of the nozzle assembly 800. In a third region 838, where the outer path vanes 820 of the outer airflow passage 812*b* is moved away from the outlet 803 of the nozzle assembly 800, wakes are avoided and the flow may smooth out prior to exiting at the outlet 803 of the nozzle assembly 800.

Although FIGS. 8A-8C illustrate a few different mechanisms for improving operation of a nozzle assembly, it will be appreciated that the combination of the features described is not required. That is, in some embodiments of the present disclosure, a nozzle assembly may be substantially similar to that of FIG. 7A, but rather than a solid body center body, a hollow body center body (e.g., as shown in FIG. 8A) may be employed. That is, the other changes to the nozzle assembly (e.g., position of gas swirlers, position of air swirlers, arrangement of the fluid passages) may not be implemented, while still providing advantages over prior nozzle assemblies. Similarly, in some embodiments, the fluid passage modification(s) may be used without a hollow body center body. As such, the present disclosure is not limited to the specific arrangement of FIG. 8A, but rather such configuration is provided for simplicity and ease of introducing features as described herein.

Referring again to FIG. 8A, the nozzle assembly 800 may be formed of multiple housing arranged to define the fluid passages. For example, as shown, an inner housing 850 may house the center body 816 and define the center body airflow passage 812*c* within the center body 816 and the inner airflow passage 812*a* between and exterior surface of the center body 816 and an interior surface of the inner housing 850. The inner housing 850 may define or form the air inflow tube 814. Radially outward from the inner housing 850 is an intermediate housing. The inner housing 850 and the intermediate housing 852 define a portion (e.g., the axial portion) of the first fluid passage 808 between an exterior surface of the inner housing 850 and an interior surface of the intermediate housing 852. The intermediate housing 852 may define a portion (e.g., the axial portion) of the second flow passage 810 and may include the vane swirler assembly 830 and the accelerating passage 832 downstream from the vane swirler assembly 830. An outer housing 854 is arranged radially outward from the intermediate housing 852. An inner surface of the outer housing 854 and an outer surface of the intermediate housing 852 define the outer airflow passage 812*b* and includes the outer path vanes 820.

Although described above as surfaces of the respective housings 850, 852, 854 defining portions of the passages, this is not to be limiting. For example, in some embodiments, a given housing my completely define the respective passage with material/structure thereof. However, the positional relationship of the passages relative to the housing is the same, with the inner housing 850 arranged radially inward from the intermediate housing 852 and the outer housing 854 arranged radially outward from the intermediate housing 852. Further, although shown as three separate housings 850, 852, 854 with the center body 816 installed within the inner housing 850, such separate parts is not to be limiting. For example, in some embodiments, one or more of the housings 850, 852, 854 and/or the center body 816 may be integrally formed (e.g., cast, molded, additively manufactured) as a single unitary body. Further, it may be advantageous for each housing 850, 852, 854 and/or the center body 816 to be formed of the same or different material.

Advantageously, embodiments described herein provide for improved fuel nozzle assemblies for use with gas turbine engines (e.g., industrial or aircraft applications). In accordance with some embodiments of the present disclosure, hydrogen fuel may be efficiently introduced into turbine engine systems through the use of the nozzle assemblies described herein. Various aspects, as described above, can help prevent attaching of the hydrogen to surfaces of the nozzle assembly through increasing flow rates and reducing stagnation, wakes, and the like that can cause hydrogen to attach to surfaces. For example, by incorporating a hollow body center body into the nozzle assembly, an axial, airflow having little or now swirl may be directed along an axis of the nozzle assembly and reduce or prevent recirculation of combustion materials at the end of the center body. Another mechanism that may be employed to improve nozzle assembly performance is the change in position of the swirl vanes for both the gaseous and liquid fuels. But introducing swirl in a more upstream location, wakes and other disruptive flows may be evened out before mixing of the fuels. As such, stagnation may be avoided and attachment by hydrogen may be reduced or eliminated.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A fuel injector for a gas turbine engine comprising:
an inner housing having a center body installed within the inner housing;
an intermediate housing arranged radially outward from the inner housing; and
an outer housing arranged radially outward from the intermediate housing;
wherein:
the center body is a hollow body structure defining a center body airflow passage therethrough;
a first fluid passage is partially defined between an outer surface of the inner housing and an inner surface of the intermediate housing;
a second fluid passage is partially defined within the intermediate housing; and
a third fluid passage comprises the center body airflow passage, an inner airflow passage defined between an exterior surface of the center body and an interior surface of the inner housing, and an outer airflow passage that is defined by the outer housing and radially outward from the intermediate housing,
wherein the center body includes an open first end and a downstream second end comprising an impingement plate and an effusion plate.

2. The fuel injector of claim 1, wherein the center body comprises inner path vanes arranged on the exterior surface thereof, the inner path vanes arranged within the inner airflow passage to impart a swirl to a fluid passing therethrough.

3. The fuel injector of claim 1, wherein the intermediate housing includes a gas swirler vane assembly arranged within the second fluid passage to impart a swirl to a fluid passing through the second fluid passage.

4. The fuel injector of claim 3, wherein the second fluid passage comprises an accelerating passage defined downstream of the gas swirler vane assembly.

5. The fuel injector of claim 1, wherein the second fluid passage comprises an accelerating passage at an outlet of the second fluid passage.

6. The fuel injector of claim 1, wherein the outer housing includes one or more outer path vanes arranged within the outer airflow passage to impart a swirl to a fluid passing through the outer airflow passage.

7. The fuel injector of claim 1, wherein the first fluid passage is configured to receive a liquid fuel.

8. The fuel injector of claim 7, wherein the liquid fuel comprises water.

9. The fuel injector of claim 1, wherein the second fluid passage is configured to receive a gaseous fuel.

10. The fuel injector of claim 9, wherein the gaseous fuel comprises hydrogen.

11. A turbine engine comprising:
a compressor section and a combustor section, wherein the combustor section comprises a fuel injector in accordance with claim 1.

12. A fuel injector for a gas turbine engine comprising:
an inner housing having a center body installed within the inner housing;
an intermediate housing arranged radially outward from the inner housing; and
an outer housing arranged radially outward from the intermediate housing;
wherein:
the center body is a hollow body structure defining a center body airflow passage therethrough;
a first fluid passage is partially defined between an outer surface of the inner housing and an inner surface of the intermediate housing;
a second fluid passage is partially defined within the intermediate housing; and
a third fluid passage comprises the center body airflow passage, an inner airflow passage defined between an exterior surface of the center body and an interior surface of the inner housing, and an outer airflow passage that is defined by the outer housing and radially outward from the intermediate housing,
wherein the intermediate housing includes a gas swirler vane assembly arranged within the second fluid passage to impart a swirl to a fluid passing through the second fluid passage and the second fluid passage comprises an accelerating passage defined downstream of the gas swirler vane assembly.

13. A turbine engine comprising:
a compressor section and a combustor section, wherein the combustor section comprises a fuel injector in accordance with claim 12.

14. A fuel injector for a gas turbine engine comprising:
an inner housing having a center body installed within the inner housing;
an intermediate housing arranged radially outward from the inner housing; and
an outer housing arranged radially outward from the intermediate housing;
wherein:
the center body is a hollow body structure defining a center body airflow passage therethrough;
a first fluid passage is partially defined between an outer surface of the inner housing and an inner surface of the intermediate housing;
a second fluid passage is partially defined within the intermediate housing; and
a third fluid passage comprises the center body airflow passage, an inner airflow passage defined between an exterior surface of the center body and an interior surface of the inner housing, and an outer airflow passage that is defined by the outer housing and radially outward from the intermediate housing, wherein the second fluid passage comprises an accelerating passage at an outlet of the second fluid passage.

15. A turbine engine comprising:
a compressor section and a combustor section, wherein the combustor section comprises a fuel injector in accordance with claim 14.

16. A fuel injector for a gas turbine engine comprising:
an inner housing having a center body installed within the inner housing;
an intermediate housing arranged radially outward from the inner housing; and
an outer housing arranged radially outward from the intermediate housing;
wherein:
  the center body is a hollow body structure defining a center body airflow passage therethrough;
  a first fluid passage is partially defined between an outer surface of the inner housing and an inner surface of the intermediate housing;
  a second fluid passage is partially defined within the intermediate housing; and
  a third fluid passage comprises the center body airflow passage, an inner airflow passage defined between an exterior surface of the center body and an interior surface of the inner housing, and an outer airflow passage that is defined by the outer housing and radially outward from the intermediate housing,
wherein the outer housing includes one or more outer path vanes arranged within the outer airflow passage to impart a swirl to a fluid passing through the outer airflow passage.

17. A turbine engine comprising:
a compressor section and a combustor section, wherein the combustor section comprises a fuel injector in accordance with claim 16.

* * * * *